Dec. 18, 1956  L. F. THIRY ET AL  2,774,620
RESILIENT JOINT
Filed Feb. 11, 1952  2 Sheets-Sheet 1
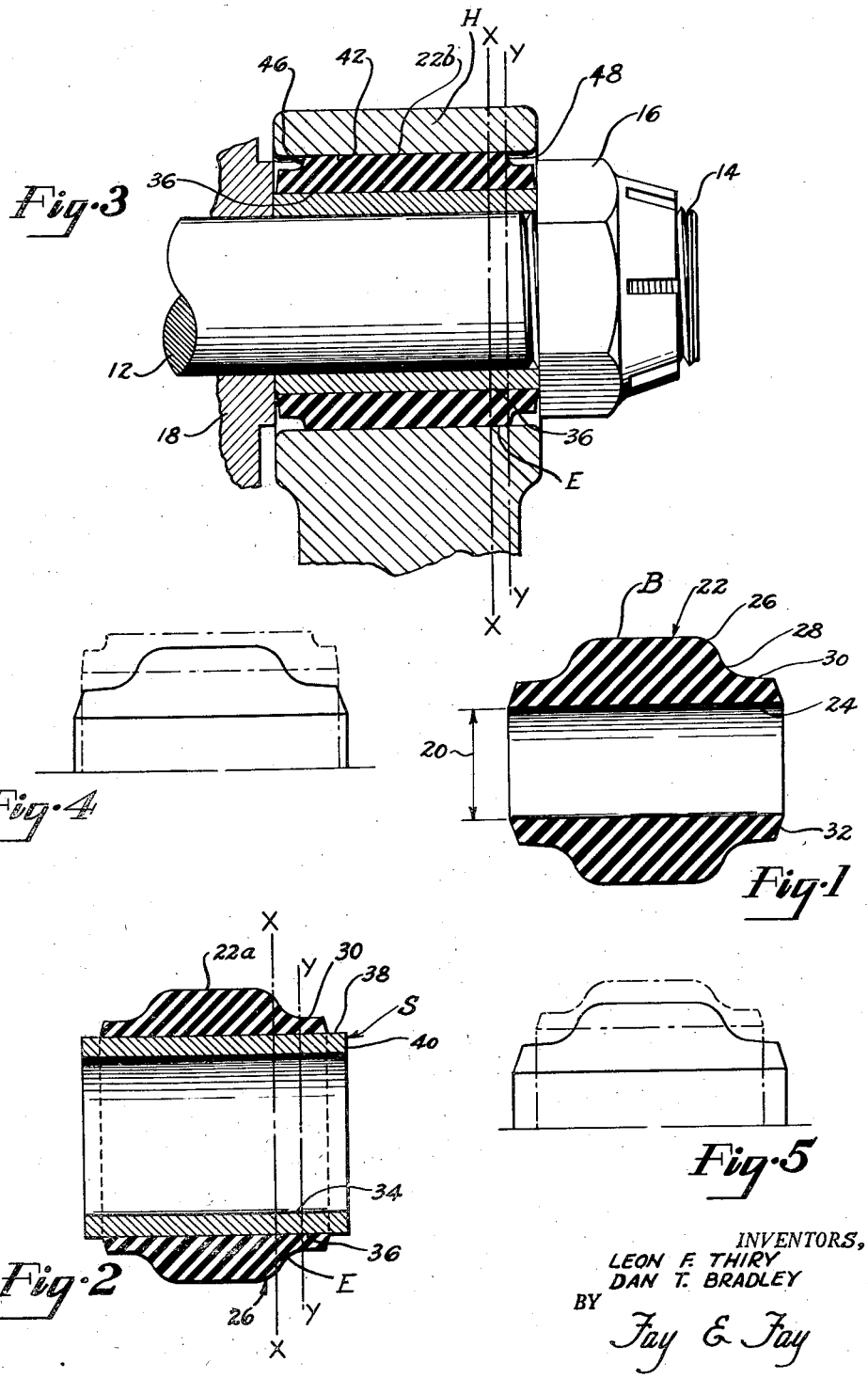
INVENTORS,
LEON F. THIRY
DAN T. BRADLEY
BY
Fay & Fay
ATTORNEYS

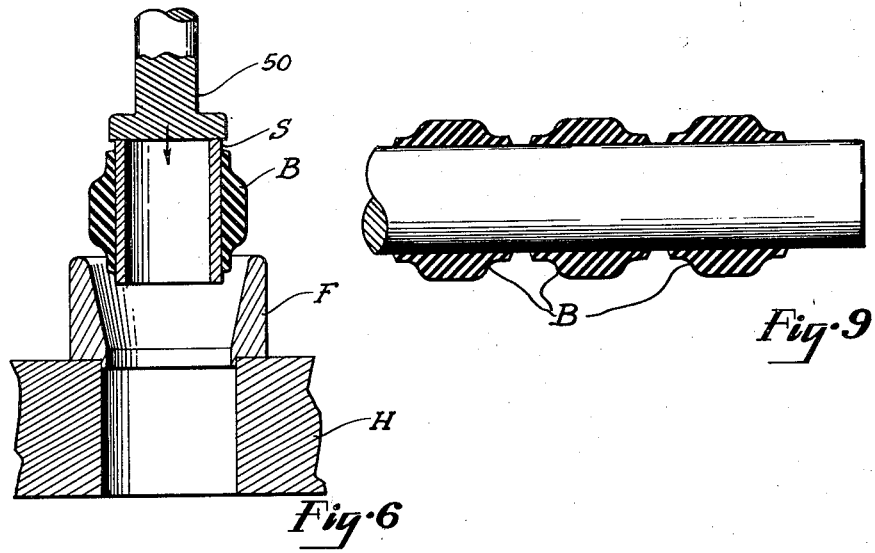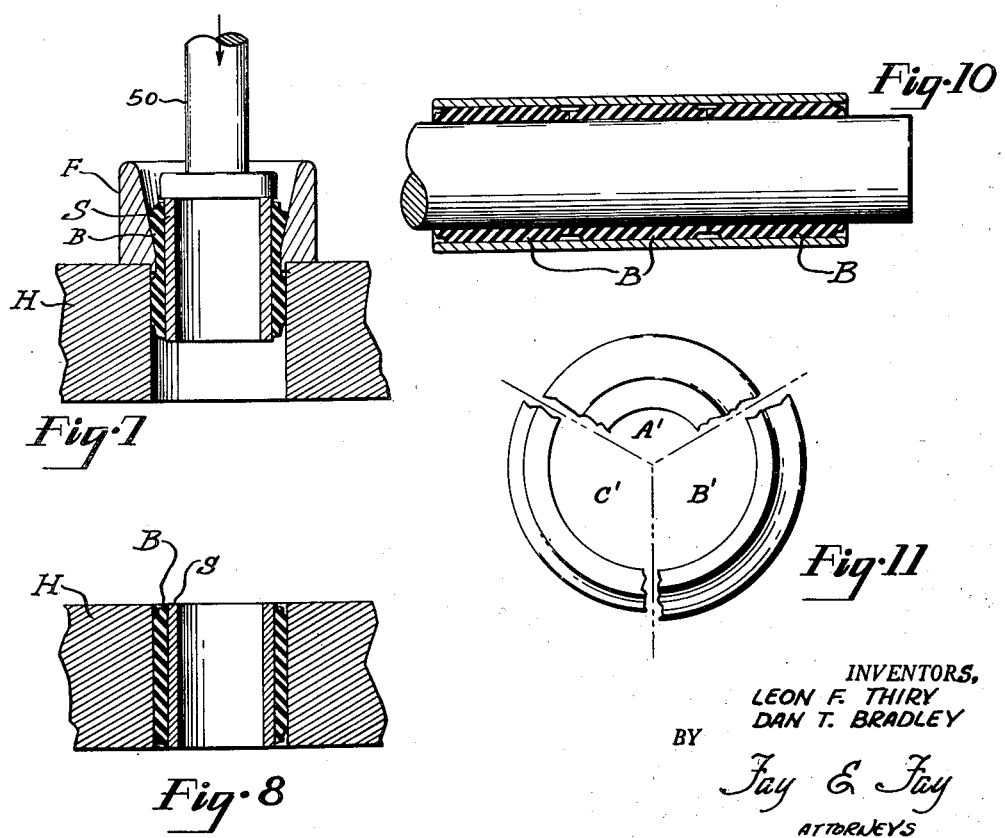

United States Patent Office 2,774,620
Patented Dec. 18, 1956

2,774,620

RESILIENT JOINT

Leon F. Thiry, Chagrin Falls, and Dan T. Bradley, Shaker Heights, Ohio; said Bradley assignor to Harris Products Company, a corporation of Ohio Application February 11, 1952, Serial No. 271,010

2 Claims. (Cl. 287—85)

The present invention relates to an improved bushing or yielding mount of the type employing a pair of concentric bearing members connected by an intermediate annular bushing of rubber or rubber-like material which adheres to the bearing members to allow relative movements in any direction between the inner and outer bearing members to be taken entirely by distortion of the rubber without appreciable slippage of the rubber upon a bearing part.

Heretofore bushings of this type have been made in accordance with three distinct types of design, and experience has brought out certain limitations and drawbacks of either a structural or economic character inherent in each of the prior art designs. One of these designs, which may be generally identified as the end compression type, is that which employs a free rubber bushing adapted to be slipped between two concentric surfaces with the bushing having a slight relative clearance to each surface. After the bushing is inserted between the surfaces, end compression is applied which distorts the rubber and compresses it inwardly and outwardly against the rigid surfaces to form a pressure friction type of adhesion. Bushings of this kind have been used on spring shackles, shock absorber bushings and the like.

A second type of bushing of a pre-assembled form is that in which the rubber is stretched between two concentric surfaces by one of the several methods. In bushings of this kind the manufacturer would furnish to the user a pre-assembled bushing having both inner and outer sleeves with the rubber stretched therebetween. The user of the bushing would press the outer sleeve of the assembled bushing into the bore of a housing or like member or would clamp the outer sleeve to the main frame of the mechanism and firmly fix the inner sleeve to the oscillating mechanism either by clamp bolts, by press fit on the inside diameter thereof, or by other similar suitable means.

A third design of this type is that wherein the rubber element is vulcanized or bonded to an inner sleeve and sold by the manufacturer in this form to the user who would then press the article into an outer sleeve which would be either a tubular member or a hole bored in the frame of the eventual mechanism. Bushings of this kind are disclosed in Patent No. 2,044,392.

Bushings of the first design have been utilized for applications such as automobile spring shackles and shock absorber bearings in which the angle of motion is relatively small. It is, of course, almost impossible to obtain any great degree of adhesive pressure between the rubber and metal surfaces of this type of bushing since rubber is incompressible and such pressure as is available in this type is maintained by a relatively limited amount of the elastic material stretched outwardly at the ends of the bushing since the amount of energy available to be stored in the bushing by distortion of the rubber is relatively small in this design. A slight permanent set or a loss in volume due to abrasion will bring about an impairment of effective functioning of the bushing. Perhaps the major advantage of this type of bushing which brought about its wide use was its relatively low cost.

Pre-assembled bushings of the second type described above have been successfully employed for certain uses in the trade for many years. Since the rubber in bushings of this type is pre-stretched in assembly, it is possible to construct these bushings with approximately 50% of the rubber volume required for bushings of the first type, while still producing a finished product which normally has at least twice the angle before slip and whose endurance life is ordinarily twice that of the first type of bushing described. The disadvantage of this design is that the manufacturer of the bushing is required to make the complete assembly, including the outer tubular member or sleeve, which, of course, adds to the cost of the bushing, as it is ordinarily extremely difficult to make this kind of assembly upon the machine parts themselves. The user of the bushing is thus forced to machine the bore into which the outer sleeve of the bushing is pressed to very close tolerance.

The third method described above makes possible a lower cost assembly in that in many instances the outer sleeve can be eliminated. Since in this type the rubber can be inserted directly into the bore of the housing, the tolerances of this bore diameter can be increased substantially, thus considerably reducing machining costs. Several very serious objections, however, are inherent in this design, particularly because of the cost of rubber fabrication is increased due to the necessity of vulcanizing the rubber directly to the inner metal or steel member in the molding process. Special preparation of the outer surface of the inner sleeve is necessitated which also involves a considerable amount of inspection, and if a poor vulcanized bond between the rubber and metal results, a high percentage of scrap loss results. It is, of course, appreciated in the trade that this type of adhesion is expensive and presents a tremendous control problem with respect to the condition of the metal surfaces and the humidity and cleanliness of the air when the metals are being prepared for molding. Such a vulcanized process usually requires either a brass plating of the metal, followed by an application of suitable rubber cement, or by a chemical cleaning of the metal either by sand blasting or by treatment of the metal with solvent vapors followed by the application of several costs of rubber cement. Since rubber cements contain a highly volatile solvent it will be evident in this kind of adhesion work that, if the humidity is too high, the cooling effect of the evaporation of the solvent will cause the formation of moisture on the surface of the metal. When this happens, poor adhesion of the rubber to the metal may be expected.

Another difficulty in this type of design is that the rubber is firmly and permanently fixed to the outer surface of the inner metal member, and when distortion of the rubber is brought about as a result of the introduction of the product into an outer sleeve or housing, there will obviously be a much greater degree of stretch in the rubber at the ends of the product then in the central portion. It has also been found that when vulcanized members of this kind are inserted into the outer member a fold or crease develops on the exposed end surfaces of the bushing since the inner surface of the bushing, being bonded to the outer surface of the inner sleeve, is not free to move axially on the sleeve when radial compression is applied.

It is an object of this invention to provide a rubber bushing and sleeve combination unit in which the rubber is pre-assembled upon an inner sleeve, without being vulcanized thereto, in such a manner that the rubber will have a relatively high grip upon the sleeve so that the article can be subsequently assembled into an outer sleeve by the use of a simple funnel with pressure being applied to the inner member.

It is also an object of this invention to provide an improved article in which the outer sleeve may either be part of the housing mechanism itself or may be a separate sleeve to be fixed to the frame of the mechanism by any suitable means.

A further object of the invention is to provide a bushing in which the rubber, when forced into the outer sleeve of lesser diameter than the diameter of the rubber element, will be able to elongate axially, particularly at the ends thereof along the outer surface of the inner member.

Other objects and advantages of the invention will be apparent from the following description of a preferred form of the invention, reference being made to the accompanying drawings wherein:

Fig. 1 is a central sectional side elevation of one form of the improved rubber bushing element shown in its free state;

Fig. 2 is a similar section of the bushing illustrated in Fig. 1 when radially opened upon an inner sleeve;

Fig. 3 is a central section of the joint illustrated in Fig. 2 when assembled in a radius rod assembly;

Fig. 4 shows in outline form in an upper half section the bushing illustrated in Fig. 1 with solid lines outlining the Fig. 1 bushing form, and dot and dash lines outlining the Fig. 3 form, and with the bushing shape achieved in Fig. 3 superimposed on the Fig. 1 form;

Fig. 5 in an upper half section, shows in solid lines the bushing shape illustrated in Fig. 1 in contrast to the shape achieved in Fig. 2 as shown in dot and dash lines superimposed thereon;

Figs. 6, 7 and 8 are cross-sectional views of a pusher and funnel assembly for arranging the radially opened joint of Fig. 2 inside an outer housing or sleeve;

Fig. 9 is a view similar to Fig. 2 showing a plurality of spaced rubber bushing elements mounted upon a single inner member;

Fig. 10 is a view similar to Fig. 9 showing the multiple bushing elements of Fig. 9 compressed within an outer sleeve; and Fig. 11 is an end view of the rubber bushing elements illustrated in Figs. 1, 2 and 3, the $A^1$ sector representing Fig. 1, the $B^1$ sector Fig. 2 and the $C^1$ sector Fig. 3.

Referring now to the attached drawings, one form of the improved rubber bushing B is illustrated in Fig. 1 in the free state or undistorted form. Fig. 2 shows the bushing B mounted upon an inner sleeve S, and in Fig. 3 the bushing and sleeve unit depicted in Fig. 2 is shown assembled in an outer housing H forming a part of a radius rod assembly. Radius rod 12 is disposed within the bore of sleeve S and the threaded end 14 of the rod 12 has nut 16 mounted thereon to hold sleeve S against a vertically extending superstructure or frame element 18. The improved bushing combination is, of course, useful in a great many other applications besides a radius rod assembly, which is shown only as a typical illustration.

In its free state as shown in Fig. 1, bushing B has a bore 20, an outer cylindrical surface 22 intermediate the ends, and an inner cylindrical surface 24. The ends of the cylindrical portion 22 are rounded off at 26 and blended at 28 into shoulders 30 of reduced wall thickness relative to the central portion of the bushing. The end abutment portion or end face 32 of the bushing is tapered inwardly at each end.

In assembling the bushing and sleeve combination shown in Fig. 2 it will be noted that the bore of bushing B is of considerably less diameter than the external diameter of sleeve S and hence bushing B must be radially opened as it is mounted upon sleeve S by means of suitable assembly operation effected in the presence of the proper lubricant. Comparison of the dimensions and form of the rubber shown in Figs. 1 and 2 will indicate that the internal diameter of the bushing B is substantially increased, and also that the outer diameter is increased, but to a lesser degree than the internal diameter thereof. It will also be noted that the radial deformation brought about in this assembly step effects an axial shortening of the bushing which is particularly noticeable along the inner surface 24 of the bushing. It will also be noted that the radial deformation brought about in the mounting operation effects a reduction in the wall thickness of the bushing. The cumulative effect of the opening operation of the bushing upon the sleeve is thus a reduction in wall thickness, an axial shortening of the bushing, particularly noticeable along the inner portion of the bushing, and an increase in the outer diameter of the bushing of lesser amount than the increase in the inner diameter. The axial shortening of the bushing as illustrated in Fig. 2 leaves exposed areas 38 at the end of the sleeve representing the distance from end face 32 of the bushing to the sleeve end 40.

The greater thickness of the wall section intermediate the ends of the bushing thus brings about a greater radial pressure in the thickened portion of the bushing that bears against the outer surface 36 of the sleeve, while, in the illustration shown, a uniform degree of circular elongation or distortion has been effected in the bushing. The gripping pressure of the bushing will be of considerably higher order in the thickened portion than at the ends because of the difference in the amount of rubber resisting the distortion or deformation. This differential order of radial pressure upon the inner sleeve is an important part of the invention since it provides a central anchorage or grip of the bushing upon the sleeve which tends to resist any axial slippage from the forces that will be encountered when the unit shown in Fig. 2 is forced into an outer sleeve or housing of lesser internal diameter than the outer diameter of the joint illustrated in Fig. 2. Of equal importance probably is the lesser order of pressure at the ends of the bushing which allow these portions of reduced thickness to slip axially outward along the sleeve during the final assembly operation.

The assembly of the unit shown in Fig. 2 into an outer housing H is illustrated in the successive views shown in Figs. 6, 7 and 8. A T-shaped pusher element 50 forces sleeve S having upon it the radially opened bushing into a tapered funnel F mounted upon the housing H, and this is generally done in conjunction with the use of a suitable lubricant. As the pusher forces the radially opened bushing into the housing, as shown in Fig. 7, the greater pressure or grip of the bushing upon the sleeve in the central portion prevents axial movement of the bushing and provides an anchorage therefor. Since the internal diameter of the housing or sleeve H is less than the outer diameter of the radially opened bushing, this final assembly operation effects an axial elongation or deformation of the bushing which is particularly noticeable, in the particular shape shown, in the outer portion of the bushing. The central thickened portion of the bushing is thus subjected to considerable radial compression or deformation and, since rubber is incompressible, the end portions of the bushing are translated axially. It will be noted in the final assembly views shown in Figs. 3 and 8 that the end faces 32 of the bushing have moved axially to a position substantially at the end of the sleeve, thus moving over and covering the exposed areas 38 seen in Fig. 2.

Comparison of the axial length of the cylindrical surface 22 of the free bushing B and the axial length of the outer cylindrical surface of the bushing as indicated at 22b (Fig. 3) in the assembly operation will show that a substantial axial extension has been achieved along this surface, while little or no axial extension is brought about along the inner surface 24 of the bushing as shown in Fig. 1 relative to the length illustrated in Fig. 3. However, since some axial shortening was brought about in the preliminary or intermediate mounting operation of the bushing upon the inner sleeve, leaving an exposed area 38 at the ends of the sleeve, it will be apparent that some axial elongation of the bushing along the inner surface 24 takes place during the final assembly operation in that the end portions of the bushing, which were not under the same degree of radial pressure as was the central portion, have been able to slip axially outward.

The axial length of the outer housing or sleeve will normally be equal to or sometimes somewhat less than the length of the inner sleeve S, and hence, as shown in Fig. 3, the portion of the rubber bushing that contacts the inner surface 42 of housing H will be in a state of substantial radial compression. It will be noted that outwardly of surface 46 of the rubber bushing a recess is provided between the exposed end portions 48 of the housing bore 42 and the shoulder 30. The shoulder portions 30 of the rubber bushing, being of reduced thickness, will not be subjected to compression and will only be subject to the deformation effected during the radial stretching over the inner sleeve.

It will be noted that in the version of the bushing illustrated in Fig. 1 and assembled as in Fig. 3, the shoulder portion of the bushing 30 is not brought in contact with the exposed end portions 48 of the bore 42 of the outer housing. It will be clear, however, that the intermediate end portion of the bushing, i. e., that zone of the bushing shown between the dot-dash lines x—x and y—y, that is, the portion E lying between the end of the cylindrical portion 26 and the inner termination of the extended shoulder 30, will be brought into pressure friction adherence with the bore 42 of the outer member as a result of the radial compression of the central portion of the bushing and the subsequent swelling or expansion of the end portion E.

In designing a bushing of the kind discussed above in order to accomplish the purposes outlined, it will be apparent that the center section of the rubber element must have sufficient pressure or grip against the inner sleeve to carry it through the funnel during final assembly operation and to resist the axial forces produced by reducing the outer diameter of the rubber during the final step. These axial forces will be a function of the amount of reduction in the assembled rubber wall brought about by the constriction of the outer sleeve or bore, the angle of the funnel, the lubrication of the funnel and of the bore in which the rubber bushing is pressed. The effective hardness of the rubber compound will, of course, also have an effect on the pressure. It will be evident that in any one design, the particular axial force involved will be a summation of all of the above factors and therefore the force may vary from one part to another as these various designs and assembly factors are altered. In the development of any one particular bushing, therefore, it is ordinarily necessary to determine experimentally the forces involved.

Certain general principles may, however, be set forth, since it will be obvious that the grip of the rubber bushing upon the inner tube must be greater than the axial force to be encountered during the final assembly operation if the rubber bushing as mounted upon the inner sleeve is to be properly brought through the funnel into an outer housing member. This grip will be a function of the total radial pressure of the rubber against the inner sleeve multiplied by the coefficient of adherence and/or friction of the rubber to metal. In order to produce a part in which the rubber is evenly displaced it has been found desirable to have a section at the center of the rubber which has sufficient grip in itself to carry the predeformed assembly into the outer member through a funnel. This can be produced by either a light pressure and a high coefficient of friction, or by a greater pressure and a lower coefficient of friction as will be the case when some lubricant is present. There is, therefore, a considerable flexibility in design and method in arriving at the desirable gripping action, which is a fundamental part of this invention. In order to obtain the proper distribution of rubber it has been found that there must be a zone at the center which has high gripping action and end zones of less grip of such a degree as will allow these end sections to slide on the inner tube when the outer diameter is reduced.

It is believed that the gripping pressure of the rubber upon the inner sleeve is the function of three elements, which are (1) the increase in diameter of the rubber during the radial opening operation, (2) the wall thickness of the rubber when opened, and (3) the hardness of the rubber involved. It will be seen that here again several variables are present which may be altered in any particular case to produce the basically desired result. If, for instance, the center zone is made of a thicker section and the end zones of reduced wall thickness it will be apparent that the grip of the rubber against the inner sleeve will be greatly reduced in the end zones since less rubber will be distorted in the end portions. This differential in radial gripping pressure may be accomplished by several designs, such for instance as a variation in the outer diameter of the rubber insert or by an increase in its inner diameter, which will finally accomplish the same results as explained above even when the outer diameter is held constant, or changed to a lesser degree.

It may be well here to restate the basic concepts of this invention, which are to produce a rubber and metal joint with the rubber held in position against the metal only by a friction or adherence effect produced by the stretching or deformation of the rubber. The rubber and metal pressure must be sufficiently great at the central section of the joint to prevent slippage when introduced into a bore, the diameter of which is less than the diameter of the rubber as assembled to the bore. A third concept of the invention is to have end sections of the rubber which have a lower gripping pressure upon the metal than does the rubber at the center section and this may be accomplished either by a reduction in the pressure exerted by the rubber at the end sections or by a change in the coefficient of friction of rubber to metal so that the distortion of the outer diameter, which will result in an increase in length or an axial elongation thereof, will cause these end zones to slide outwardly upon the inner sleeve and prevent local high deformation of any particular rubber section. As has been explained above, the resilient unit shown in Fig. 2 may either be supplied to an eventual user for assembly into the user's housing member, or the user may be supplied a completed unit with the rubber assembled between inner and outer concentric sleeves.

Tests have indicated that a combination such as that shown in Fig. 2, when assembled in an outer sleeve or housing, is far easier to assemble into the bore of a sleeve or outer housing than is a bonded rubber element. It has also been found that whereas in the assembly of a vulcanized bonded part, portions of the rubber flow over on themselves and thus form points of high concentration of stress and abrasion between portions of the rubber. In the instant invention, the extended ends of the bushing stretch out to make a symmetrical assembly with smooth contours and no high stress concentrations, and the portion E between the central portion at 22 and the extended shoulder 30 is swelled or expanded into engagement with the bore of the outer member as a result of the reduction in diameter of the contiguous central portion.

Another advantageous result of the design as illustrated in Fig. 3 is that direct positive radial pressure is exerted by the rubber along the entire length of the inner sleeve to the ends thereof. In prior designs of this kind there has customarily been an area near the end of the sleeve where no or insufficient radial pressure was applied in the contacting area and experience has proved that wear develops at this scuff point when the rubber turns upon the inner sleeve under twisting forces. In the present invention a high order of pressure is maintained right up to the end of the inner sleeve where the twisting moment is ordinarily greatest, and, since this pressure is sufficiently high to resist shearing forces applicable, the scuff point or area heretofore troublesome is eliminated.

It is important also to explain that the design involved in this invention seems to lend itself extremely well to applications where it is desirable to have a plurality of rubber bushing elements disposed upon a single sleeve, such for instance as in tank track bushings. In Fig. 9 there is shown a multiplicity of radially deformed bushings mounted upon a single inner sleeve or pin, and in Fig. 10, the final assembly product. The assembly of a plurality of rubber bushing elements upon a single inner sleeve may be achieved without difficulty, and because of the central anchorage of these rubber bushings upon the sleeve they will hold their position during the final assembly operation without slippage except that desired in the end sections to bring the rubber bushings substantially into contact all along the inner sleeve.

It has for many years been common to use a vulcanized bonded arrangement in tank track bushings wherein a multiplicity of individual bonded rubber elements are mounted upon the inner member. Tests over an extended period have shown that in this design the bonded rubber "doughnuts," as they are called, when subjected to radial compression, tend to have the rubber end faces fold back on each other causing wear and abrasion at the fold points. It is believed that in the new design as illustrated in Figs. 9 and 10 a considerably improved product can be produced, since the axial elongation of the rubber units shown in Fig. 9 during the final assembly operation brings the rubber inserts substantially into contact, this substantially filling the bore of the final assembly in contrast to the partial filling achieved by the bonded arrangement and eliminating the local high stress deformation points present in a bonded assembly.

It will be apparent from the foregoing explanation that the particular end shape of the rubber bushing element may be varied somewhat in particular applications, and it is believed possible to have end shapes which are tapered or elliptical, for instance, while still achieving the basic effect of the design. It has been found desirable, however, to use a smooth contour at the ends of the bushing and to provide a recess area of the rubber between the inner and outer sleeve ends which allows the rubber to bulge outwardly during final assembly and during the application of torsional or axial forces into an area not subject to radial compression. It should also be noted that it has been found desirable to round off the bushing as at 26 to facilitate the final assembly operation.

It is believed that a basic achievement of this invention is to provide a rubber and metal unit in which the necessary radial deformation of the rubber upon the inner sleeve is effected by the manufacturer, so that the final user need only to take the joint as shown in Fig. 2 and assemble it into the outer housing with a minimum of further deformation.

To summarize the improvements in the invention described above it will be noted that there is here present the advantage of a uniform rubber distribution, plus an extremely simple final assembly operation and, in addition, reduced cost in the molding of the rubber element. It is well known in the rubber industry that the cost of molding of rubber parts depends to a considerable degree upon the number of cavities that can be put in a given size mold. In the design discussed herein, the outside diameter of the rubber as molded is very much less than that of a bonded part intended for a similar use, and therefore it is possible to achieve a reduction in cost due to the larger number of pieces that can be put into a given mold. It may also be pointed out that through this invention there is no problem of cementing the rubber to the inner metal, and since, with a given rubber element of known size and stiffness, the pressures will be constant, it is only necessary with the product of this invention to be sure that the surfaces are correct in order to produce a given coefficient of friction. As a result it is possible to have a far greater degree of uniformity at a considerably lower cost than has heretofore been possible.

It should be understood that when the word "cylinder" is used in the foregoing specification and in the claims it is intended that the meaning include cylinders whose bases may be elliptical, circular, polygonal, or other variations thereof, since for particular applications it may be desirable to use a cylindrical conformation other than right circular without departing from the spirit of the invention. It is likewise intended that the words "bore" and "diameter" include a corresponding dimension in other cylindrical forms referred to above. It is also apparent that the outer surface 22a of the bushing B, as viewed in Fig. 2, could be humped in the mid-portion as long as the final assembly operation is not rendered more difficult.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

We claim:

1. A bearing comprising in combination an externally cylindrical inner member, an internally cylindrical outer member coaxial with and spaced radially outwardly of the inner member, and an annular rubber-like bushing element dilated upon the inner member and engaging said members in pressure friction adherence, said bushing element in its free state having a bore substantially less in diameter than the outer diameter of the inner member, and having in the free state a central portion of considerably greater wall thickness than the thickness of the end portions, the central and end portions of the bushing in the free state having a substantially symmetrical conformation when viewed in longitudinal cross section and the end portions having an average annular cross-sectional area in the dilated state before insertion into the outer member substantially less than the annular cross-sectional area between the said inner and outer members, the central portion of the bushing having in its free state an average annular cross-sectional area greater than the annular cross-sectional area between the inner and outer members, the wall thickness of the central and end portions of the bushing being so proportioned that, when the dilated bushing mounted upon the inner member is contractilely inserted into the outer member, the central portion is radially compressed and the end portions are expanded into pressure friction engagement with said outer member contiguous with and axial beyond the engagement of the central portion to the outer member, the length of the bushing measured along the bore being substantially the same in both the free and assembled states.

2. A bearing comprising in combination an externally cylindrical inner member, an internally cylindrical outer member coaxial with and spaced radially outwardly of the inner member, and an annular rubber-like bushing element dilated upon the inner member and engaging said members in pressure friction adherence, said bushing element in its free state having a bore substantially less in diameter than the outer diameter of the inner member, and having in the free state a central portion of considerably greater wall thickness than the thickness of at least one end portion, and at least one end portion having an average annular cross-sectional area in the dilated state before insertion into the outer member substantially less than the annular cross-sectional area between the said inner and outer members, the central portion of the bushing having in its free state an average annular cross-sectional area greater than the annular cross-sectional area between the inner and outer members, the wall thickness of the central and at least one end portion of the bushing being so proportioned that, when the dilated bushing mounted upon the inner member is contractilely inserted into the outer member, the central portion is radially compressed and at least the said one end portion is expanded into pressure friction engagement with said outer member contiguous with and axially beyond the engagement of the central portion to the outer member, the length of the bushing measured along the bore being substantially the same in both the free and assembled states.

References Cited in the file of this patent

UNITED STATES PATENTS

| | | |
|---|---|---|
| 1,876,924 | Hastings et al. | Sept. 13, 1932 |
| 1,985,781 | Hufferd et al. | Dec. 25, 1934 |
| 2,044,392 | Lord | June 16, 1936 |
| 2,047,976 | Lord | July 21, 1936 |
| 2,122,839 | Guy | July 5, 1938 |
| 2,291,623 | Hanson et al. | Aug. 4, 1942 |
| 2,346,574 | Guy | Apr. 11, 1944 |
| 2,396,848 | Haushalter | Mar. 19, 1946 |
| 2,468,985 | Krotz | May 3, 1949 |
| 2,550,564 | Hutton | Apr. 24, 1951 |

FOREIGN PATENTS

| | | |
|---|---|---|
| 351,196 | Great Britain | June 25, 1931 |
| 971,650 | France | Aug. 9, 1950 |